United States Patent [19]
Crowley et al.

[11] Patent Number: 6,112,106
[45] Date of Patent: *Aug. 29, 2000

[54] ANTENNA TRANSMISSION COUPLING ARRANGEMENT

[76] Inventors: Robert J. Crowley, 64 Puritan La., Sudbury, Mass. 01776; Donald N. Halgren, 35 Central St., Manchester, Mass. 01944

[*] Notice: This patent is subject to a terminal disclaimer.

[21] Appl. No.: 09/009,220

[22] Filed: Jan. 20, 1998

Related U.S. Application Data

[63] Continuation of application No. 08/581,065, Dec. 29, 1995, which is a continuation-in-part of application No. 08/042,879, Apr. 5, 1993, Pat. No. 5,493,702.

[51] Int. Cl.⁷ ............................... A04B 1/38; A01Q 1/57
[52] U.S. Cl. ..................... 455/575; 455/90; 343/841
[58] Field of Search ................... 455/575, 90, 89, 455/117, 128, 129, 325, 345; 343/841, 702, 703, 720; 379/437, 451, 446, 455, 58, 59; 361/814; 102/393

[56] References Cited

U.S. PATENT DOCUMENTS

| | | | |
|---|---|---|---|
| 4,220,955 | 9/1980 | Frye | 343/720 |
| 4,724,766 | 2/1988 | LaBudde | 102/393 |
| 4,845,738 | 7/1989 | Takano | 455/569 |
| 5,020,149 | 5/1991 | Hemmie | 455/325 |
| 5,161,255 | 11/1992 | Tsuchiya | 455/345 |
| 5,170,173 | 12/1992 | Krenz et al. | 343/702 |
| 5,193,219 | 3/1993 | Tamura | 455/571 |
| 5,357,262 | 10/1994 | Blaese | 343/906 |
| 5,367,556 | 11/1994 | Marui et al. | 455/569 |
| 5,493,702 | 2/1996 | Crowley et al. | 455/575 |
| 5,711,014 | 1/1998 | Crowley et al. | 455/575 |

*Primary Examiner*—Dwayne D. Bost
*Assistant Examiner*—Raymond B. Persino
*Attorney, Agent, or Firm*—Don Halgren

[57] ABSTRACT

The present invention comprises a docking system for connecting a portable communication device to a further signal transmission line, the portable communication device having an external radiative antenna, the system comprising a shielded housing for receivably enclosing at least a portion of the external radiative antenna of the portable communication device and a coupling probe mounted within the shielded housing for radiatively coupling between the external antenna of the portable communication device and the further signal transmission line via radio frequency energy therebetween.

19 Claims, 2 Drawing Sheets

ANTENNA TRANSMISSION COUPLING ARRANGEMENT

This is a continuation of copending application(s) Ser. No. 08/581,065 filed on Dec. 29, 1995 which is a C.I.P. of Ser. No. 08/042,879 filed Apr. 5, 1993 now U.S. Pat. No. 5,493,702 which is incorporated herein by reference.

BACKGROUND OF THE INVENTION (1) Field of the Invention

This invention relates to a docking system for handheld electronic devices such as cellular telephones or the like, for structures or vehicles.

(2) Prior Art

Extraneous radio frequency emission has become a serious concern of hand-held electronic communication devices such as portable facsimile machines, ground position indicators, and cellular telephone manufacturers and users alike. RF radiation is considered a potential carcinogen.

The proliferation of these hand-held devices is evident everywhere. Hand held devices however, should be usable in automobiles, planes, cabs or buildings without causing concern of the radiation therefrom The hand-held devices should be portable for a user to carry in his pocket, yet be able to use that same cellular unit in such vehicle or building while minimizing such radiational effect therein.

It is an object of the present invention to permit a user of a portable hand-held electronic communication device such as a cellular telephone or the like, to conveniently use that same hand-held device/cellular phone in an automobile, plane or building, or anywhere transmission is needed.

It is a further object of the present invention to minimize any radiation from such a hand-held device, such as a cellular telephone, while such use occurs in an automobile, a building or an elevator, an airplane, a cab, or other public facility in which the user wishes to minimize his exposure to stray radiation, to permit re-transmission, to avoid the necessity of connecting and deconnecting cables and to permit a wide variety of cellular telephones such as would be utilized in a rental car where various manufactures' phones would be used; and to avoid repeated reuse of coaxial connections that would otherwise be subject to wear, dirt and poor connections so as to be the source of undesired RF leakage.

BRIEF SUMMARY OF THE INVENTION

The present invention comprises a docking system adaptable to an automobile, plane or building for receipt of and cradling of a hand-held electronic, device such as a cellular telephone, to permit a mating of the antenna of the cellular telephone, with an emissive free receiver, to direct the signal through a coax cable and a further outside antenna.

The docking system includes a housing which also captures the hand-held cellular telephone. The housing may include a contact arrangement to charge the hand-held cellular telephone batteries during its cradling within the vehicle or building.

The housing comprises a metal case, such as aluminum or a conductive plastic which matively receives the antenna and the telephone unit itself. The housing comprises a separate compartment for the antenna and for the telephone. The antenna compartment may be brass lined on its inner surface with a silver plating thereon. A broadband coupling probe is arranged adjacent the antenna within the antenna compartment. A ferrite attenuator may be arranged between the antenna compartment and telephone compartment of the housing. A metallic backplate may be arranged to capacitively couple the telephone chassis to an RF ground.

A coupling probe may be attached, through a proper coaxial cable, to an external antenna, in the vehicle or building, as the case may be.

It is an object of the present invention to provide a shielded antenna docking arrangement for using a portable hand held telephone in a vehicle such as a plane, an automobile or a cab or in a public or private building or elevator.

It is a further object of the present invention to provide an efficient low cost quick coupling of a hand held portable telephone to use in an automobile, building or plane while providing an improved range for use of that telephone.

It is yet a further object of the present invention to provide a system which permits the shielded use of a hand held (cellular) telephone, while also providing a recharging of the batteries of that hand held telephone.

The invention thus includes an arrangement for permitting the safe, shielded use of a hand-held electronic device such as a cellular telephone in a structure comprising: a conductive housing having an antenna compartment; a partition separating the antenna compartment from the telephone; an antenna adapter arranged to transfer signals with respect to an antenna of the cellular telephone and an external antenna therewith.

The invention also includes the antenna compartment with an RF lining shield arranged therein. The RF lining may comprise a silver-plated brass shield. The separator partition may comprise a ferrite attenuator. The invention may include a means for charging the cellular telephone while it is disposed within the housing. The housing may be connected to a remote loudspeaker and microphone, to permit a cellular hand-held telephone to be operated "hand-free" therewith. The structure may be an automobile, a building, an airplane, or an elevator. The invention includes a method for permitting the safe, shielded use of a hand-held cellular telephone in a structure, comprising the steps of: providing a conductive housing for enclosure of an antenna and a cellular telephone therewith; empowering the housing with a support circuit to permit use of such a cellular telephone therewith; shielding the antenna within the conductive housing so as to contain RF signals therewithin; transmitting signals between an external antenna and an antenna enclosed within the conductive housing; resonating said conductive housing near the operating frequency of the telephone; coupling transmitted and received RF energy through the antenna to an external transmission line and antenna external of the structure.

The invention includes a method for permitting the safe, shielded use of a hand held electronic device such as a cellular telephone having a short antenna thereon, in a structure, comprising the steps of: providing a conductive housing arranged to radiationally enclose the short external antenna of a hand held cellular telephone; connecting the conductive housing through an RF transmission line and connector, to an antenna external of the structure; resonating the conductive housing near the operating frequency of the hand held cellular telephone; coupling transmitted and received RF energy from the short antenna through the antenna external of the structure.

The invention thus comprises a docking system for connecting a portable communication device to a further signal transmission line, the portable communication device having an external radiative antenna, the system comprising a shielded housing for receivably enclosing at least a portion of the external radiative antenna of the portable communication device; and a coupling probe mounted within the shielded housing for radiatively coupling between the external antenna of the portable communication device and the further signal transmission line via radio frequency energy therebetween. The shielded housing is comprised of an electrically conductive material. A radio frequency absorbent material is arranged within the shielded housing. The radio frequency absorbent material is ferrite. The signal transmission line comprises a further antenna located at a location remote from the shielded housing. The shielded housing is articulable with respect to the further antenna. The signal transmission line comprises a coaxial electrical cable. The portable communication device is a cellular telephone. The shielded housing is articulably attached to a support structure, to permit adjustability with respect thereto.

The invention also comprises a method of coupling a portable communication device having an external radiative antenna, to a signal transmission line for the purpose of effecting radio signal transmission therebetween, the method comprising the steps of arranging a shielded housing in attachment with the signal transmission line, mounting a coupling probe within the shielded housing and in communication with the signal transmission line, and inserting the external antenna of the portable communication device into the shielded housing so as to permit radiative communication between the radiative antenna and the signal transmission line via the coupling probe. The method includes the steps of attaching a further antenna to the signal transmission line at a location remote from the shielded housing, energizing said portable communication device so as to effectuate radiative transmission between the external radiative antenna of the portable communication device, and the coupling probe attached to the signal transmission line, arranging the signal transmission line in a structure; and articulating the shielded housing with respect to the structure to facilitate mating of the external antenna with respect to the shielded housing.

The invention also includes a system for coupling a cellular telephone having an external radiative antenna, to a separate signal transmission line, the system comprising a shielded housing arranged to confiningly contain radio frequency energy, and a coupling probe mounted within the housing, which probe is also in electrical communication with the signal transmission line, the coupling probe arranged to radiatively transfer radio frequency energy between an external radiative antenna of a cellular telephone placed a spaced distance thereadjacent, and the signal transmission line, to effectuate coupling thereof when the cellular telephone is energized. The signal transmission line also comprises a further radiative antenna disposed remotely with respect to the shielded housing.

BRIEF DESCRIPTION OF THE DRAWINGS

The objects and advantages of the present invention will become more apparent when viewed in conjunction with the following drawings in which.

DESCRIPTION OF THE PREFERRED EMBODIMENTS

Figure 1:
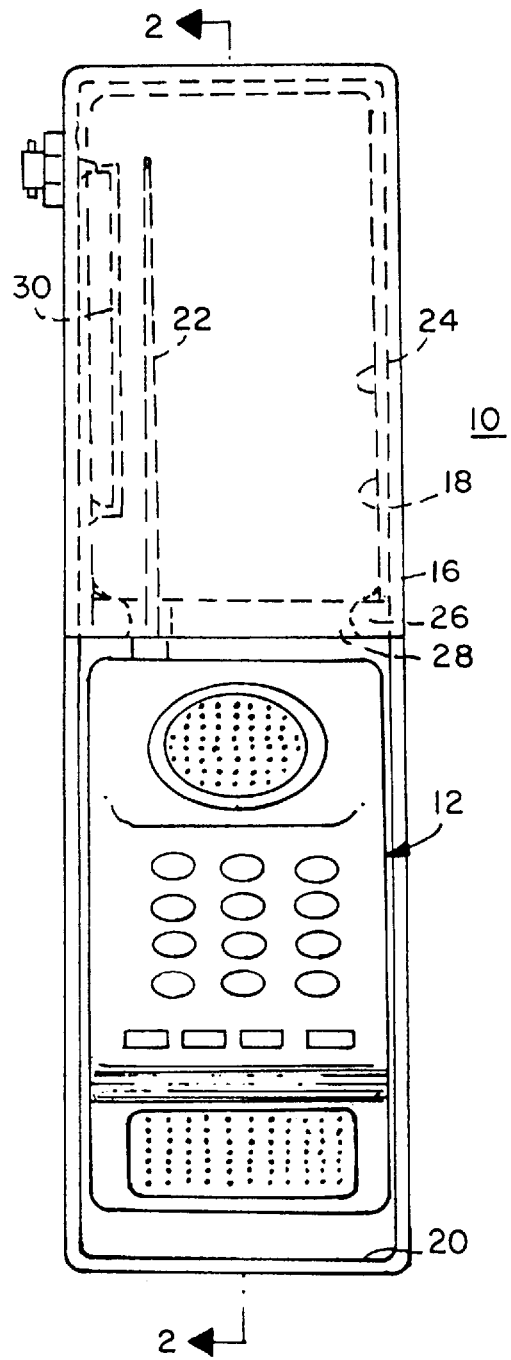
FIG. 1 is a plan view of a telephone docking housing arrangement, with portions omitted for clarity.

Referring now to the drawings in detail, and particularly to FIG. 1, there is shown a portable communication device docking arrangement 10, to permit a portable communication device such as a hand-held cellular telephone 12 to be utilized anywhere, such as within a vehicle or structure or adjacent thereto, and as a personal communicator (telephone) carried on an individual.

The docking arrangement 10 comprises a housing 16, fabricated typically from a metal, such as aluminum, or from a conductively coated plastic, such as a polycarbonate. The docking arrangement includes the housing 16 which may be divided into an antenna receiving compartment 18, and a cellular telephone receiving compartment 20. The antenna receiving compartment 18, is more fully resonant at the frequency range of about 860 MHz, and fully encloses an antenna 22 received therein, to provide RF shielding therefrom. The antenna compartment 18 may have silver plated brass 24 lining the inner walls thereof, as shown in FIG. 1. The antenna compartment 18, preferably has interior dimensions of about 4.5 cm by about 1.9 cm by about 12.38 cm, or other dimensions which provides a rough equivalent volume in the antenna compartment 18, as the aforementioned dimensions. This produces a fundamental resonant frequency of about 286 MHz and will operate efficiently at about 860 MHz which is the third harmonic frequency and provides a cavity large enough to accommodate most cellular telephone antennas. It is adaptable to other frequencies that 860 MHz, from the VHF region to the microwave region through dimensional changes in the antenna compartment 18. An antenna piercable wall structure for segregating the antenna compartment 18 from the user, may preferably be comprised of a ferrite attenuator 26, or partition, which acts as a choke between the antenna compartment 18 and the user and telephone compartment 20, to prevent the emission from the antenna compartment 18, of stray RF energy, or at least lower it to an acceptable level. An opening 28 is disposed within the ferrite attenuator 26, to permit an antenna 22 to be disposed within the compartment 18.

Figure 3:
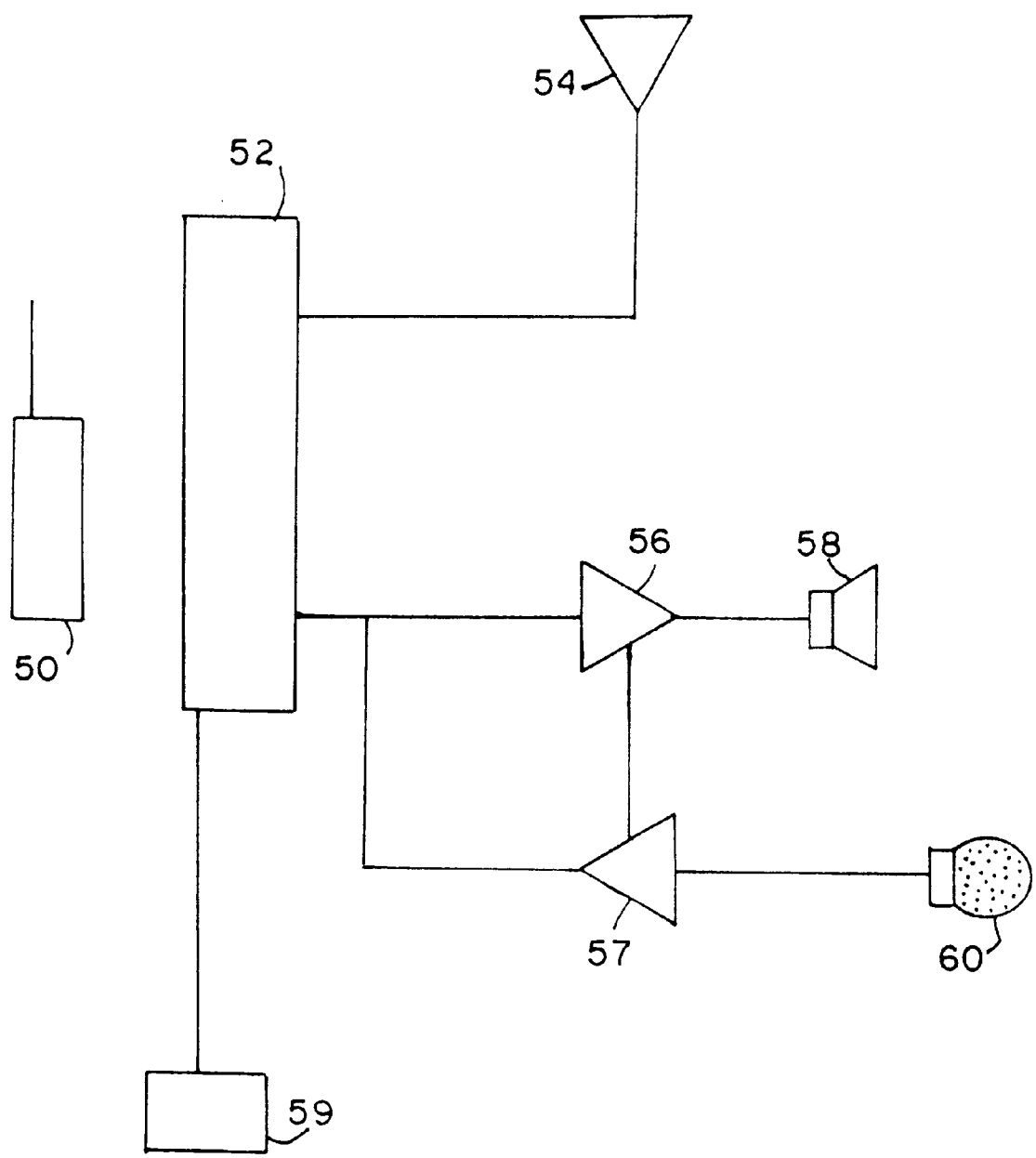
FIG. 3 is a block diagram of a docking system for a handheld cellular telephone.

A broadband coupling probe 30 is arranged within the antenna compartment 18, and is connected, through appropriate coax cable 53 to an external antenna 54, (vehicle structure) as also shown in FIG. 3, in block diagram form. The coupling probe is tuned to a central resonant frequency of about 860 MHz,, with a nominal 50 ohm load at the terminal. The probe 30 may also be comprised of an ungrounded capacitive coupling probe or plate, which serves the same function as the inductive probe. Other couplings 30 may include radiation couplings and galvanic couplings which are arrangeable in close proximity to the antenna 22, for transmission to and from the external antenna 54.

Figure 2:
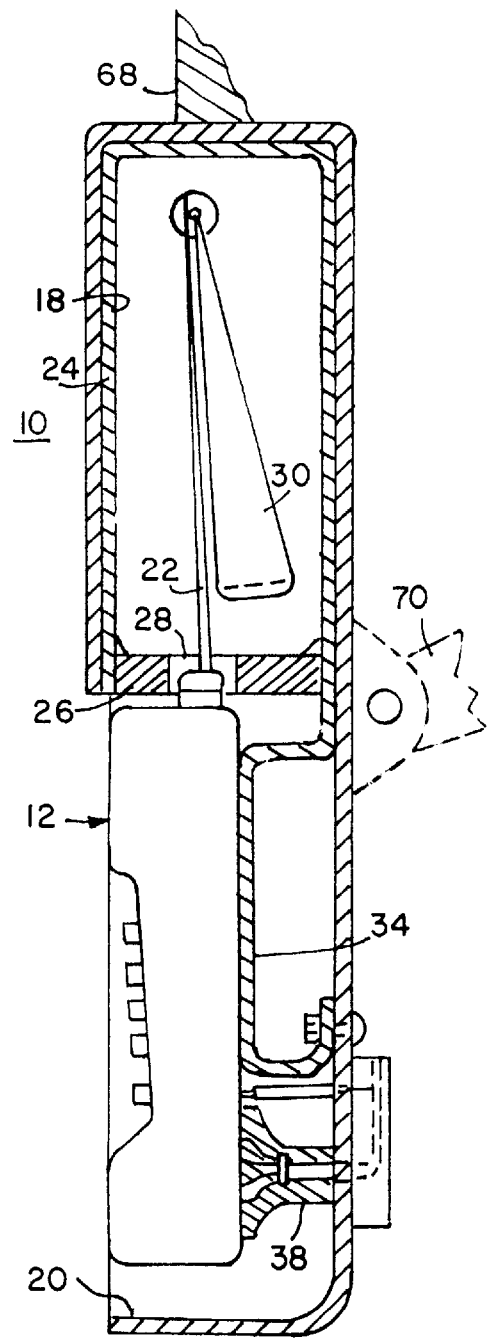
FIG. 2 is a view taken along the lines A—A of FIG. 1.

The telephone 12 is arranged to be snugly received within the telephone compartment 20, as shown in FIGS. 1 and 2. The compartment 20, may have a capacitive ground backing plate 34, made of aluminum, in conductive communication with the housing 16. The housing 16, is of course attached to an RF ground connector 36, such RF ground being carried to the ground side of the connector.

The telephone compartment 20 may have a biased charger pin arrangement 38, which is in connective communication with the electrical system of the structure (vehicle, building or airplane), to permit the hand-held cellular telephone 12 to be charged while it is emplaced within the docking arrangement 10.

The block diagram of the docking arrangement 10, is shown in FIG. 3, wherein a hand held cellular telephone unit 50 is placed in antenna mating relationship with a coupling probe of a cellular phone dock 52. The dock 52 is attached for example, to an external (automobile) antenna 54. It is to be noted that the dock 52 could be disposed in the wall of a building, or in an elevator, an airplane, or just about anywhere an external antenna may be arranged to pickup RF signals and keep them from close proximity to a person who is using the hand held cellular unit. The dock may be actually built into a wall 68 of the entity using the dock 52, or it may be on an articulable arm 70, so as to bring the dock 52 within adjustable reach of people. The dock 52, in any case, may be attached to an audio output amplifier 56 which feeds a signal to a loudspeaker 58, when it is set up in a vehicle. A remote mounted microphone 60 is connected to a microphone null amplifier 57 and the output amplifier 56, to permit hands-free operation of a telephone 50 while using this docking arrangement 10 in an automobile (or other aforementioned facility) without acoustic feedback.

The telephone unit 50 is charged through a 12.8 volt regulator 59, which picks up power through the electrical system of the structure (automobile, building or airplane), to which the docking arrangement 10 is attached. The unit permits efficient, inexpensive and convenient means for holding and operating a handheld cellular telephone within a vehicle, airplane or building, while effectively shielding the occupants from potentially harmful RF energy.

We claim:

1. A method of communicating between a personal communication device and a further circuit, comprising the steps of:

arranging a receiving support for receiving and supporting said personal communications device, said personal communication device having an elongated external, linear, radiative first antenna;

aligning an elongated, linear, radiative coupling probe adjacent said receiving support and in an adjacent, parallel, closely spaced-apart and offset relationship to provide a capacitive coupling arrangement with respect to said radiative first antenna;

connecting said radiative coupling probe to a further circuit for communication with said first antenna; and energizing said personal communication device so as to receive and/or send an electronic signal thereby, through radiative communication between said first antenna and said further circuit.

2. The method of communicating between a personal communication device and a further circuit, as recited in claim 1, including the step of:

arranging said coupling probe in a separate housing.

3. The method of communicating between a personal communication device and a further circuit, as recited in claim 2, including the step of:

shielding said coupling probe within said housing, while permitting radio frequency communication between said first antenna and said coupling probe.

4. The method of communicating between a personal communication device and a further circuit, as recited in claim 1, including the step of:

making said coupling probe as a generally flat electrical conductor.

5. The method of communicating between a personal communication device and a further circuit, as recited in claim 4, including the step of:

attaching a second antenna to said further circuit, to permit radio frequency communication between said personal communication device and said second antenna via said coupling probe.

6. A method of improving the communication of a personal communication device using a farther circuit therewith, said personal communication device having an externally radiative antenna, said method comprising the steps of:

providing a receiving support for receiving and supporting said personal communication device;

attaching an ungrounded capacitive coupling plate coupling probe to said receiving support so as to be in an offset, parallel and adjacent relationship with respect to said externally radiative antenna of said personal communication device to permit radio frequency communication therebetween;

connecting said coupling probe to a further circuit;

connecting a microphone independent of said personal communication device, to said further circuit;

connecting said further circuit to a second antenna; and placing a personal communication device within said receiving support so that its externally radiative antenna is adjacent to and offset from said coupling probe; and energizing said personal communication device to permit communication therewith, through said second antenna in said further circuit.

7. The method of improving the radio frequency communication of a personal communication device using a further circuit therewith, as recited in claim 6, including the steps of installing a battery in said personal communication device; and charging said battery in said personal communication device while said personal communication device is arranged within said receiving support.

8. The method of improving the radio frequency communication of a personal communication device using a further circuit therewith, as recited in claim 6, including the step of:

connecting a loudspeaker independent of said personal communication device, with said further circuit, to permit said personal communication device to improve communication therewith.

9. The method of improving the radio frequency communication of a personal communication device using a further circuit therewith, as recited in claim 6, including the step of:

arranging an amplifier in said further circuit, to improve the signal communicated with said personal communication device.

10. A method of improving the communication of a personal communication device using a further circuit therewith, said personal communication device having an externally radiative antenna, said method comprising the steps of:

providing a receiving support for receiving and supporting said personal communication device;

attaching an ungrounded coupling plate coupling probe to said receiving support so as to be in an offset and adjacent relationship with respect to said externally radiative antenna of said personal communication device to permit radio frequency communication therebetween;

connecting said coupling probe to a further circuit;

connecting a loudspeaker independent of said personal communication device, to said further circuit;

connecting said further circuit to a second antenna; and placing a personal communication device within said receiving support so that its externally radiative antenna is adjacent to said coupling probe; and energizing said personal communication device to permit communication therewith, through said second antenna.

11. The method of improving the radio frequency communication of a personal communication device using a further circuit therewith, as recited in claim 10, including the steps of installing a battery in said personal communication device; and charging said battery in said personal communication device while said personal communication device is arranged within said receiving support.

12. The method of improving the radio frequency communication of a personal communication device using a further circuit therewith, as recited in claim 10, including the step of:

connecting a microphone independent of said personal communication device, with said further circuit, to permit said personal communication device to improve communication through said further circuit.

13. The method of improving the radio frequency communication of a personal communication device using a further circuit therewith, as recited in claim 10, including the step of:

arranging said probe in a separate enclosure housing adjacent said receiving support.

14. The method of improving the radio frequency communication of a personal communication device using a further circuit therewith, as recited in claim 10, including the step of:

shielding at least part of said probe in a radio frequency shielded housing.

15. The method of improving the radio frequency communication of a personal communication device using a further circuit therewith, as recited in claim 10, including the step of:

arranging said probe to be generally parallel alignment with said externally radiative antenna of said personal communication device.

16. The method of improving the radio frequency communication of a personal communication device using a further circuit therewith, as recited in claim 10, including the step of:

placing said receiving support in a movable structure such as an automobile or an airplane.

17. The method of improving the radio frequency communication of a personal communication device using a further circuit therewith, as recited in claim 10, wherein said personal communication device comprises a cellular telephone.

18. The method of improving the radio frequency communication of a personal communication device using a further circuit therewith, as recited in claim 6, including the step of:

operating said personal communication device at a frequency from the very high frequency region of the spectrum to the microwave region of the spectrum.

19. The method of improving the radio frequency communication of a personal communication device using a further circuit therewith, as recited in claim 18, wherein said personal communication device comprises a cellular telephone.

* * * * *